United States Patent Office 3,414,462
Patented Dec. 3, 1968

3,414,462
GYPSUM ARTICLES RESISTANT TO EROSION BY WATER AND A METHOD FOR THEIR PRODUCTION
Gerald Waterworth Cafferata, Nottingham, England, assignor to BPB Industries Limited
No Drawing. Filed May 25, 1964, Ser. No. 370,095
Claims priority, application Great Britain, June 7, 1963, 22,897/63
6 Claims. (Cl. 161—166)

ABSTRACT OF THE DISCLOSURE

Cast gypsum articles resistant to erosion by water are produced by forming a mix of water and ingredients consisting essentially of plaster and a lime selected from a group consisting of calcium, dolomitic and magnesium lime and mixtures thereof, compressing the mix to at least 100 p.s.i. and causing the molded mix to set. Erosion resistance is further improved by carbonating the lime on the exposed surface.

---

This invention relates to the production of articles moulded from mixes containing calcium sulphate plaster.

Moulded articles of calcium sulphate plaster, for example, structural elements such as blocks, panels and tiles, have previously been cast by the well-known process which comprises forming a pourable mix composed essentially of plaster and water, transferring the mix to a mould and allowing it to set and dry out, the mix being supported in the mould until it has at least partially set. In order to render the initial mix sufficiently fluid it is usually necessary to use excess water, that is, "free" water in excess of that theoretically required to hydrate the plaster fully. This excess or "free" water is removed during the drying out process to leave a finished product that is porous and hence of relatively low strength and hardness. Furthermore, the set plaster of the product is appreciably soluble in water.

Elements produced by the above process have, therefore, been regarded as unsuitable for use in the construction of external walls and similar structures that are required to withstand mechanical wear and/or exposure to excessive moisture, weathering or running water.

It has been proposed to provide conventionally cast plaster-of-Paris articles with an artificial protective skin, for example by painting them with paints, lacquers or bituminous compositions or spraying them with silicone or other waterproofing solutions, but it has been found that truly weather-resistant surfaces cannot be obtained by such methods. In another technique, small amounts of lime and/or calcium carbonate are incorporated in the plaster mix, and the set article is then treated by spraying or immersion with a solution of phosphoric, oxalic or fatty acid or salts thereof, which react with the lime and/or calcium carbonate to convert the surface of the article into a water insoluble calcium salt of these acids. Such artificial coatings have not proved very effective, even when given a surface coating of paint or lacquer and suffer from the serious drawback that even the slightest flaw in the surface or the surface coating permits the penetration of water to erode the underlying plaster. Such erosion can continue unnoticed for long periods with resultant cavities being formed under the protecting skin, which elsewhere may remain more or less intact until subjected to local pressure when it will collapse and expose the underlying cavity. Such coatings, moreover, do little or nothing to improve on the relatively low strength and hardness of conventionally cast articles to which they are applied.

It has now been found that when 10% or more of calcium, dolomitic or magnesium lime, based on the weight of dry plaster, is included in the initial plaster and water mix and the mix consolidated before the commencement of setting, for example by compression and/or vibration, a cast article can be obtained which has a higher water resistance and equal or increased strength and hardness as compared with plaster articles cast by the conventional method.

According to the invention there is provided an article comprising a set, consolidated, moulded mix containing calcium sulphate plaster, water and at least 10% of lime, based on the weight of dry plaster. The water-resistance of articles according to the invention improves greatly as carbonation of their lime content is effected.

The carbonation process can be effected by the relatively slow natural process whereby the set article is allowed to dry out gradually in the air, which normally contains sufficient carbon dioxide and water vapour to promote the reaction even when the article is relatively dry. The carbonation can be artificially accelerated by exposing the article before, during or after drying, to the action of purified flue gases and/or other atmospheres rich in carbon dioxide and water vapour. Alternatively, the carbonation can be effected by treating the article, by spraying or immersion, with water containing carbon dioxide in solution.

Consolidation of the mix prior to setting may be effected by the application of moulding pressure and/or vibration in the mould, which can be discontinued before, during or after the onset of setting.

As indicated above, conventional casting methods entail a drying out period, during which the relatively large amount of "free" or excess water initially present in the mix evaporates out of the set product after hydration is complete to leave it permeated with multitudinous pores and cavities. The consolidation technique permits the use in the method of the invention of mixes containing reduced amounts of or even no excess water; such mixes are too stiff for casting by the conventional methods, but can be made to flow under the application of pressure and/or vibration to fill a mould completely, thereafter setting to give a relatively dry product which is comparatively non-porous and therefore relatively hard and strong. Similarly, when flowable mixes including excess water are employed, the application of moulding pressure can eliminate some or all of the excess water from the mix so that the drying out of the set mix is again partly or wholly avoided. By the use of the consolidation technique, mixes of high lime content can be moulded to yield set products of strength and hardness far in excess of that possessed by conventionally cast articles of plaster-of-Paris.

It is to be noted that for a given degree of consolidation the higher the lime content of the mix the greater the resistance of the product to erosion by water but the lower its strength and hardness, while for a given lime content of the mix, the higher the degree of consolidation the greater the strength and hardness of the set product, provided that sufficient water is finally present in the moulded article to permit full hydration of its plaster content. The pressure and/or vibration applied are preferably at least sufficient to so consolidate the mix that it retains its moulded shape on removal from the mould prior to the commencement of setting. The optimum moulding pressure for a particular mix depends upon its lime content and upon the mechanical properties required of the set product. Mixes having a lime to plaster weight ratio of 9:1 or more are preferably moulded by pressures of 1,000 p.s.i. or more when very durable articles having both good mechanical strength and hardness and exceptionally high water resistance are obtained.

From the foregoing it is clear that the lime is present in an amount of at least 10% by weight of the dry plaster and up to about 90% by weight of the dry mix. In other instances, particularly when mixes of low lime content are employed, or where low water demand, high strength hemi-hydrate or anhydrous calcium sulphate plasters are employed in the mix, or where vibration of the mix is employed in addition to pressure, pressures of below 100 p.s.i. will suffice. For moulding pressures of 500 to 1,000 p.s.i., using ordinary casting plaster-of-Paris and lime without recourse to vibration of the mix, the mixture preferably contains from 25% to 75% by weight of lime, which produces moulded articles having both good mechanical strength and hardness and high water resistance.

The tensile strength of articles produced according to the invention can be enhanced by the incorporation of reinforcing fibres, textile materials, wire mesh or other reinforcement. Fibrous materials which may be so employed include glass and asbestos fibres as well as organic fibres such as sisal, wood pulp, and artificial "man-made" fibres. The proportion of such fibrous material incorporated in the mix may be varied widely. Pigments may also be incorporated in the mix if it is desired to produce coloured mouldings. Fillers may also be incorporated in the mix, such as fine silica which produces a surface finish more resistant to abrasion.

The use of special plasters in the method of the invention is not precluded, and "alpha" or anhydrous plasters can beneficially be used, as, for instance, when low moulding pressures are employed, with or without accompanying vibration. It is important to ensure, when employing "low water demand" plasters such as "alpha" hemi-hydrate or anhydrous plasters, that sufficient water is present in the initial mix or subsequently added to the moulded cast to allow full hydration of its plaster content.

In one procedure according to the invention, the wet mix includes sufficient excess water to make it flowable or plastic and in this state is introduced under pressure or otherwise into the mould, where it is subjected to pressure as indicated above, and is thereby consolidated, some of the excess water being forced out of the mix through interstices in the mould. Vibration of the mould may also be employed to aid the consolidation of the mix.

A second procedure involves pre-wetting the mixture of plaster and lime with minimal amounts of water and introducing it into the mould in a semi-dry condition. Under pressure and/or vibration such a mix becomes consolidated and completely fills the mould. The mix preferably contains at least sufficient water to ensure complete hydration of the plaster content, but additional water can, if required, be introduced into the moulded cast before setting commences, or thereafter.

In a third procedure, the mixture of plaster and lime is introduced into the mould as a dry powder, which may be pre-compressed in the mould if desired. Thereafter, preferably after the release of any pre-compression pressure, water is introduced into the mould and moulding pressure with or without vibration is applied to the wetted mix to consolidate it as aforesaid. The water introduced before compression, which may contain a wetting agent, is preferably sufficient to ensure complete hydration of the plaster content, but additional water, if required, can be introduced into the cast after moulding.

In a fourth procedure the mixture of plaster and lime and water is subjected to the manufacturing procedures known to the art for the production of artificial marble or "Scagliola." Low water demand hemi-hydrate plaster of the "alpha" type or anhydrous plaster is preferably employed in this procedure.

Combinations of any of these procedures may be employed, and the consolidation of the mix can be effected by, or aided by vibration at low or high frequencies, including those used in the manufacture of vibrated concrete products which usually are of the order of 10,000 to 20,000 cycles per minute.

In the first of the above-described procedures, where flowable or plastic mixes are to be moulded, sintered metal or other porous moulds may be employed to facilitate the escape of expressed water while still retaining the solids content of the mix in the mould, which effect can also be achieved by using filter mats or cloths in the mould.

However, where possible it is preferred to employ any of the other three of the above procedures thereby obviating the need to express surplus water from the mould.

Articles produced by the above-described pressure moulding technique initially have a relatively hard, smooth surface, of low porosity and if the plaster used in the initial mix is pure, this smooth finish is retained even after prolonged exposure to running water. Impurities originally present in the plaster, such as marl or clay may, however, be washed or leached out of the surface of the set product by running water, so that the smooth finish is marred due to a certain amount of pitting or "pin-holing" of the surface. This effect is only superficial and does not materially reduce the resistance to solution by water of the body of the article.

In the preferred case, the consolidated products retain their shape even before any setting occurs, and hence can be safely removed from the mould at this stage, thereby considerably reducing the size of plant necessary for a given output of moulded elements, as compared with that required by the conventional process. Large boards and panels of thin section which have insufficient rigidity to remain flat if unsupported, may be stacked on pallets after removal from the mould. Alternatively, a pallet may be used as the lower supporting member of the mould.

When quick-setting plaster mixes are employed, moulded articles such as boards or panels may be left in the moulding press, which may be of the multiple-opening hydraulic type having automatic loaders and unloaders to speed operations, until setting has occurred. If slow-setting plaster mixes are employed, it is advantageous to remove the articles from the presses prior to setting. Alternatively, continuous sheets or panels may be produced using a reciprocating press of suitable platen width through which the sheet or panel is fed in interrupted steps, each forward step of the sheet or panel being less than the length of the press platens, so that the continuous sheet or panel is uniformly compressed throughout its length and width. Alternatively, a continuous extrusion press may be employed.

The superior strength of the pressure- and vibration-moulded articles according to the invention may permit the use, in a given structural application, of thinner elements than would be required if conventionally produced elements were employed, so that particularly in the case of wall tiles, panels and the like, little or no increase in the amount of raw materials required, and hence in the weight or cost of the structure, need be involved. Bulkier elements of deep section, such as building blocks, can be produced as laminates, being built up in deep moulds in layers which are subjected to moulding pressure and/or vibration, either individually or collectively.

In what are called herein "multi-laminated" articles, each lamina is consolidated by pressure and/or vibration and allowed to set before the next is introduced. For example, the core or reverse side of such a multi-laminated article may be moulded at low pressure from a mix of water and plaster which may or may not include lime and/or fibrous reinforcing materials, whilst the facing lamina or laminae are moulded at high pressure from a mix having a high lime content, thereby producing an element having a hard, water-resistant surface, but which is nonetheless of relatively low overall density and hence is light and easy to handle. The lower the pressure at which the core or reverse side lamina or laminae are moulded, and the higher the fibrous content of the mix, the lower will be the overall density of the composite article. Other combinations of laminae are, of course, possible.

Alternatively, layers introduced into the mould may remain unset until the final layer has been added and the whole subjected to moulding pressure with or without vibration to produce a consolidated product. Articles produced by this method are referred to herein as "multi-layered" articles.

Combinations of these two multi-laminated or multi-layered techniques may be used, and the moulding can be carried out by the "wet," the "semi-dry," or the "dry" procedure described above, or by any combination of the three. In some instances one or more of the layers or laminae can be of known material such as conventionally moulded plaster, particularly "alpha" plaster, or wood wool slab.

Articles according to the invention can with advantage be coated with a coherent film of P.V.C. or similar material impervious to water, particularly so when the proportion of lime in the mix is at or near the lower end of the proposed range. Such coatings are conveniently applied by known spraying techniques, using say a 25% solution of P.V.C. in methyl ethyl ketone, and besides providing additional protection to the moulded article against solution by water, also renders the surface of the article so treated completely impermeable. Small flaws in such coatings are of little consequence since the underlying material is itself water-resistant. Similarly the surfaces of the articles may be protected with a silicone or wax finish to give them increased impermeability and water-repellant properties.

The consolidated articles of the invention are more resistant to erosion by water than similar lime-free casts despite the facts that the solubility of lime is only slightly less than that of gypsum, and that the incorporation of lime tends to lower the mechanical strength of set plaster products. The increase in resistance to erosion by water, resulting when steps are taken to effect the carbonation of the lime in the moulded articles of the invention, is likewise completely unexpected, since the inclusion of equivalent proportions of carbonate of lime in conventional casting plaster-of-Paris mixes does not increase the resistance to erosion.

Articles according to the invention can be used in all circumstances where similar conventionally produced plaster elements have previously been employed, the lower porosity and greater hardness and strength/volume ratio of the consolidated materials often being of advantage, especially with elements moulded at high pressures. The waterproof qualities of the articles according to the invention render them additionally suitable for use in structures liable to exposure to weathering, damp or running water. Elements such as blocks, panels and beams moulded at high pressure from mixes of high lime content are suitable for use in external walls and the like, being sufficiently durable to withstand the erosive action of severe weathering, as well as being sufficiently hard and strong to stand up to considerable abuse. The waterproof qualities of, for instance, tiles and panels according to the invention are similarly of advantage in bathrooms and kitchens and other structures whose walls are frequently in contact with steam and condensation.

The invention will be further described by reference to the following examples. In the examples all parts referred to are parts by weight unless otherwise stated.

The "tap test" to which the described products are subjected comprises placing the article 50 cms. below the orifice of a vertical pipe of 0.5 cm. bore, which is fed with mains tap water from a tank above, the level in which is 170 cms. above the article under test, so that the water (of hardness 12), flows in a continuous jet at a constant rate of 12 litres/hour onto the horizontal surface of the article under test. This test is an exceptionally severe accelerated weathering test, more so than is provided by the "Marr" Accelerated Weathering Machine which is a commercially available testing machine of the "Weatherometer" type, which has also been employed for testing the products of the invention. In the "Marr" Machine water in the form of a spray is projected onto the vertical surface of the article under test, at a rate of 10 litres/hr., using a jet air pressure of 10 p.s.i. The articles under test are carried on a rotating framework, which rotates once in about 2 hours. For the first quarter cycle the specimens are subjected to water spray and for the second quarter cycle they pass closely in front of a carbon-arc lamp which subjects the specimens to drying conditions as well as U.V. rays (which are of importance in the testing of paint films). For the remaining half cycle the specimens are subjected to drying conditions until they pass in front of the spray jets again.

EXAMPLE I

A "semi-dry" mix composed of 33.3 parts calcium lime, 66.6 parts of casting plaster-of-paris and 25 parts of water was moulded before the commencement of setting at a moulding pressure of 1,000 p.s.i., and then allowed to set. Set articles produced by this method were subjected to "tap tests" as described above.

One such article was allowed to stand on the laboratory bench for 18 hours in a damp condition after setting before being subjected to the "tap test" for 100 hours, by which time the jet of water had just produced a slight erosion of the exposed surface.

The surface of a second article which has been produced as above and left to carbonate in the same atmosphere for 300 hours, was unaffected after 250 hours exposure to the "tap test."

EXAMPLE II

A "semi-dry" mix composed of 40 parts calcium lime, 60 parts of casting plaster-of-Paris and 35 parts water was moulded at a pressure of 1,000 p.s.i. and removed from the mould before the commencement of setting and was then allowed to set and carbonation of the lime effected by drying it slowly in an atmosphere rich in carbon dioxide.

The surface of an article produced by this method was unaffected, other than to exhibit a few shallow pinholes due to the leaching out of small marl impurities originally present in the surface, after over 56 weeks (9,408 hours) exposure to the "tap test." It is interesting to note that during this period, over one hundred thousand litres (100 tons) of water has impinged on a small area of the surface of less than 1 cm. diameter.

EXAMPLE III

"Artificial Marble" technique employing pressure.

A pourable face mix composed of 40 parts calcium lime, 60 parts high quality plaster-of-Paris and 80 parts water was poured into a pressure mould and 500 parts of a "semi-dry" backing mix composed of 400 parts low quality plaster and 100 parts of water was sprinkled over the top surface of the face mix, after which the composite layered mix in the mould was vibrated and then compressed slowly to 1,000 p.s.i. and removed from the mould before setting occurred. After setting the panel was allowed to dry slowly for 500 hours in the atmosphere to cause the lime in the 1/8" thick face to become carbonated and it was then subjected to the "tap test" for over 1,500 hours without the surface of the face layer being affected.

EXAMPLE IV

An article was pressure moulded at 125 p.s.i. using a mix composed of 40 parts calcium lime, 60 parts "alpha-type" hemi-hydrate plaster and 35 parts of water and was then allowed to set and carbonation of the lime in the article effected by drying it slowly in an atmosphere rich in carbon dioxide gas. The surface of the article remains unaffected after being subjected to the tap test for 48 weeks (8,054 hours).

EXAMPLE V

A "semi-dry" mix composed of 60 parts plaster-of-Paris, 40 parts of calcium lime and 25 parts of water was compressed to 1,000 p.s.i. in a mould to produce a sheet of ½" thickness. Carbonation of the lime was effected by drying the sheet slowly in an atmosphere rich in carbon dioxide gas, after which it was tested in the "Marr" Accelerated Weathering Machine.

After 7,400 hours the surface of the sheet remains unaffected and the panel after removal from the machine and drying to constant weight has actually increased slightly in weight during the period of test.

EXAMPLE VI

A "semi-dry" mix composed of 60 parts plaster-of-Paris, 40 parts magnesium lime and 30 parts of water was compressed to 1,000 p.s.i. in a mould to produce a ½" thick sheet. Carbonation of the lime was effected by drying the sheet slowly in an atmosphere rich in carbon dioxide gas after which it was tested in the "Marr" Accelerated Weathering Machine.

After 4,300 hours the surface of the sheet remains unaffected and the weight of the sheet after drying to constant weight was found to be slightly greater than it was originally.

EXAMPLE VII

This was a repeat of Example 6 except that dolomitic lime (calcium-magnesium lime) was substituted for the magnesium lime used in that example.

The surface of the sheet likewise remains unaffected after 4,300 hours exposure in the "Marr" Accelerated Weathering Machine and the weight of the sheet after drying to constant weight was likewise found to be slightly greater than its original weight.

EXAMPLE VIII

This was a repeat of Example 6 except that calcium lime was used and carbonation of the lime effected by immersing the sheet in a saturated solution of carbon dioxide gas in water in an enclosed container. The saturated solution of carbon dioxide gas was changed daily for a week.

The surface of the sheet after 4,300 hours exposure in the "Marr" Accelerated Weathering Machine remains unaffected.

By way of comparison a number of articles produced by methods not in accordance with the invention were subjected to the "tap test," with the following results:

(a) A conventionally cast plaster-of-Paris block taken from the wall of a building constructed of such blocks, the surface of which after 30 years' normal weathering had been dissolved away uniformly to the extent of about 1/16" and in the process had developed a hard surface skin, was subjected to the tap test for 24 hours. The result of this accelerated weathering test was the erosion of the hard surface of the block to a depth of 1", the hole produced being ¾" in diameter.

(b) The hardened surface of a conventionally cast plaster-of-Paris block subjected to 30 years' exposure to normal weathering was subsequently sprayed with two coats of P.V.C. lacquer on all surfaces. The lacquered hard surface subjected to the tap test developed a small isolated hole after 100 hours, and after a further 200 hours' subjection to the tap test it was found that the interior of the block had been eroded away almost completely.

(c) An article was cast in the conventional way using a mix composed of 100 parts plaster-of-Paris and 60 parts water. After it had set, it was dried and subjected to the "tap test" for 4 hours when it was found that a large hole had been eroded in its surface, to a depth of ⅜" extending over an area of ⅜" diameter.

(d) A "semi-dry" mix composed of 100 parts plaster and 25 parts water was moulded at a pressure of 750 p.s.i. and after it had been allowed to set it was dried and subjected to the "tap test" for 4 hours when it was found that a small hole had been eroded in the surface of the article to a depth of about 1/16" extending over an area of ¼" diameter.

(e) A "semi-dry" mix composed of 40 parts precipitated chalk, 60 parts gypsum plaster and 40 parts water was moulded at a pressure of 1,000 p s.i. and removed from the mould before commencement of setting and was then allowed to set and dry slowly in the atmosphere. After 1 hour's exposure to the "tap test" the surface showed appreciable erosion and after 24 hours it had been eroded to a depth of ⅜" extending over an area of ⅜" diameter.

(f) A conventionally cast portion of a ½" thick fibrous plaster-of-Paris sheet of Australian manufacture was subjected to weathering in the "Marr" Accelerated Weathering Machine. After 7,140 hours exposure the average thickness of the sheet had been reduced to under 1/16" and its area to less than 25% of its original area, and the residual dry weight of the sheet was less than 1/20 part of its original weight.

I claim:

1. A method of producing a cast article resistant to erosion for 100 hours by water applied in accord with the tap test herein described comprising the steps of forming a mix of water and ingredients consisting essentially of a plaster selected from the group consisting of calcium sulfate alpha hemihydrate and plaster of Paris and a lime selected from the group consisting of calcium, dolomitic and magnesium lime and mixtures thereof, the weight of lime being equal to from at least 10% by weight of the dry plaster to about 90% by weight of the dry mix, introducing the mix into a mold, consolidating the solid ingredients therein under at least 125 p.s.i. when the plaster ingredient is alpha hemihydrate and under at least 500 p.s.i. when the plaster ingredient is said plaster of Paris, and thereafter causing the molded mix to set.

2. A method of producing a cast article resistant to erosion for 100 hours by water applied in accord with the tap test herein described comprising the steps of forming a mix of water and ingredients consisting essentially of a plaster selected from the group consisting of calcium sulfate alpha hemihydrate and plaster of Paris and a lime selected from the group consisting of calcium, dolomitic and magnesium lime and mixtures thereof, the weight of lime being equal to from at least 10% by weight of the dry plaster to about 90% by weight of the dry mix, introducing the mix into a mold consolidating the solid ingredients therein under at least 125 p.s.i. when the plaster ingredient is alpha hemihydrate and under at least 500 p.s.i. when the plaster ingredient is said plaster of Paris, causing the molded mix to set and thereafter causing the lime to carbonate on at least the exposed surface of said article.

3. A method of producing a laminated cast article having as at least one face a first layer resistant to erosion for 100 hours by water applied in accord with the tap test herein described comprising the steps of introducing into a mold in a position to form said erosion resistant first layer a mix of water and ingredients consisting essentially of a plaster selected from the group consisting of calcium sulfate alpha hemihydrate and plaster of Paris and a lime selected from the group consisting of calcium, dolomitic and magnesium lime and mixtures thereof, the weight of lime being equal to from at least 10% by weight of the dry plaster to about 90% by weight of the dry mix, introducing into the mold a second layer comprising plaster and water, compressing the mold contents to at least 125 p.s.i. when the plaster ingredient of said first layer is alpha hemihydrate and at least 500 p.s.i. when the plaster ingredient of said first layer is said plaster of Paris, and thereafter causing the molded mix to set.

4. A method according to claim 3 wherein the contents of the mold are consolidated before the formation of the second layer.

5. A laminated cast article having a face layer resistant to erosion for 100 hours by water applied in accord with the tap test herein described comprising a first layer consisting essentially of set calcium sulfate plaster and a lime selected from the group consisting of calcium, dolomitic and magnesium lime and mixtures thereof, the weight of the lime being equal to from at least 10% by weight of the dry plaster to about 90% by weight of the dry mix, and a second layer of lower density than said first layer and comprising set calcium sulfate plaster.

6. A cast article as in claim 5 wherein the lime is carbonated on at least the exposed surface of the face layer.

References Cited

UNITED STATES PATENTS

| | | | |
|---|---|---|---|
| 200,320 | 2/1878 | Lyons | 106—110 |
| 384,295 | 6/1888 | Stockwell | 264—240 |
| 460,105 | 9/1891 | Benedict | 106—110 |
| 806,608 | 12/1905 | Whitney | 106—118 |
| 831,296 | 9/1906 | Purvis | 264—69 |
| 1,211,445 | 1/1917 | Hofman | 106—118 |
| 1,480,867 | 1/1924 | Smith | 106—110 |
| 2,253,730 | 8/1941 | Seailles | 264—23 |
| 2,274,705 | 3/1942 | Karrick | 106—109 |
| 2,366,673 | 1/1945 | Paley | 106—110 |
| 2,539,408 | 1/1951 | Ensign | 106—110 |
| 3,060,543 | 10/1962 | Shaw | 264—71 |
| 3,149,986 | 9/1964 | Zelmanoff | 106—118 |
| 3,305,387 | 2/1967 | Fraser | 106—110 |

FOREIGN PATENTS

| | | |
|---|---|---|
| 655,737 | 1/1963 | Canada. |
| 257,391 | 9/1926 | Great Britain. |

TOBIAS E. LEVOW, *Primary Examiner.*

S. E. MOTT, *Assistant Examiner.*